United States Patent [19]
Vargiu et al.

[11] 4,191,723
[45] Mar. 4, 1980

[54] PROCESS FOR FORMING NOVOLAK RESIN COMPOSITIONS INTO MOLDING GRANULES

[75] Inventors: Silvio Vargiu, Casatenovo; Pier L. Manzoni, Codogno; Mario Bernasconi, Maleo, all of Italy

[73] Assignee: Euteco S.p.A., Milan, Italy

[21] Appl. No.: 820,814

[22] Filed: Aug. 1, 1977

[30] Foreign Application Priority Data

Aug. 5, 1976 [IT] Italy .............................. 26050 A/76

[51] Int. Cl.² ........................................ B29C 17/00
[52] U.S. Cl. .................................. 264/129; 264/151; 264/175; 264/282
[58] Field of Search ............... 264/140, 118, 144, 142, 264/175, 138, 151, 129; 425/237, 363

[56] References Cited

U.S. PATENT DOCUMENTS

| | | |
|---|---|---|
| 2,516,295 | 7/1950 | Borton et al. ..................... 264/140 |
| 2,624,514 | 1/1953 | Wilhousky ......................... 264/140 |
| 2,755,509 | 7/1956 | Smidth ............................... 264/140 |
| 3,114,930 | 12/1963 | Oldham et al. .................... 264/140 |
| 3,988,401 | 10/1976 | Kasting et al. ..................... 264/140 |

FOREIGN PATENT DOCUMENTS

| | | | |
|---|---|---|---|
| 150869 | 5/1950 | Australia ................................. 264/140 |
| 237744 | 3/1962 | Australia ................................. 264/144 |
| 1117299 | 11/1961 | Fed. Rep. of Germany ............ 264/5 |
| 51-90354 | 8/1976 | Japan ...................................... 264/144 |
| 469605 | 8/1975 | U.S.S.R. ................................. 264/140 |

*Primary Examiner*—Jay H. Woo
*Attorney, Agent, or Firm*—Biebel, French & Nauman

[57] ABSTRACT

Novolak phenolic resin compositions are formed into molding granules by homogenizing the composition above the melting point of the resin, calendering the homogenized composition with conversion into a coherent sheet, rolling the sheet between a pair of rollers, at least one of which is indented, to produce a coherent embossed sheet, fracturating the embossed sheet with separation of the granules having substantially the shape and size of the embossments, coating the granules with a phenolic compound and heat-treating the coated granules by flowing a stream of inert gas having a temperature not exceeding 130° C.

The resulting granules are free-flowing, free from a tendency to release dust and particularly suitable for injection molding.

19 Claims, 1 Drawing Figure

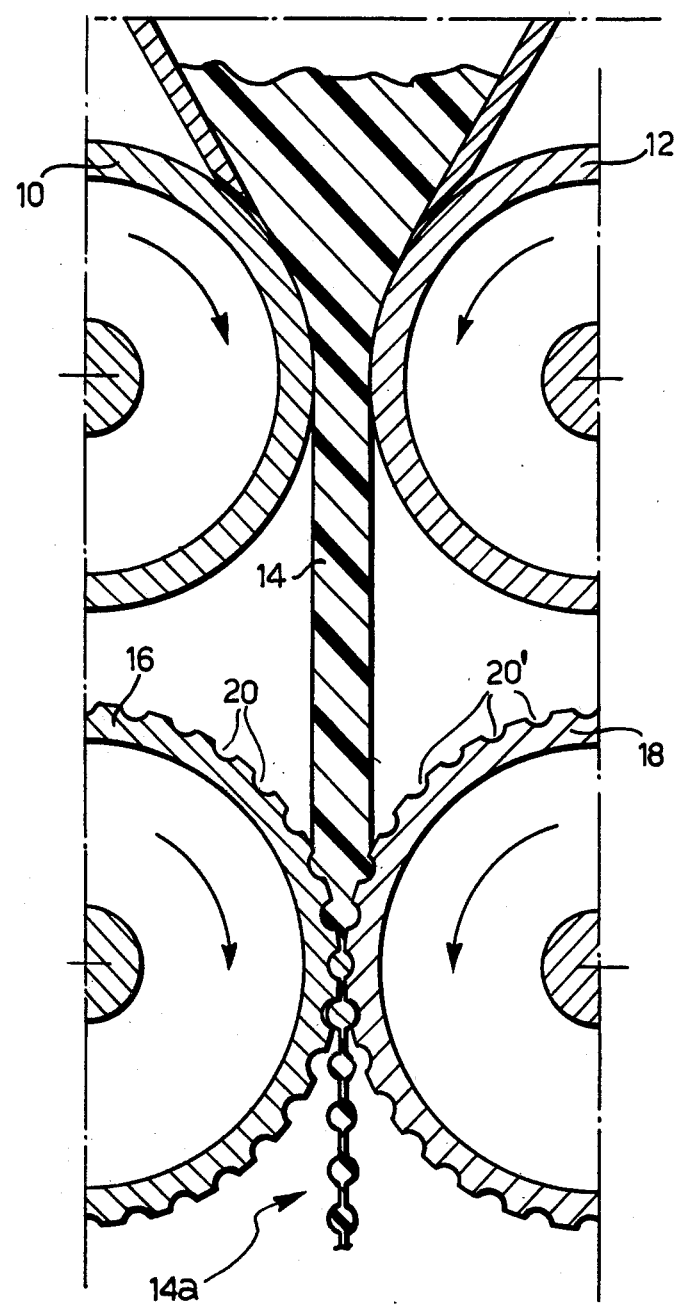

PROCESS FOR FORMING NOVOLAK RESIN COMPOSITIONS INTO MOLDING GRANULES

The present invention relates to a process for preparing novolak phenolic resin compositions, particularly suitable for injection molding, in the form of free-flowing granules free of a tendency to release dust.

Molding compositions based on a novolak phenolic resin consisting of a condensation product of phenol with formaldehyde which hardens by heating in the presence of substances such as hexamine, are known in the art.

Other constituents of these compositions are the hardening catalyst, normally selected from the oxides of the alkaline earth metals, inert fillers, and possibly also small amounts of lubricants, dyes and pigments.

As is known, these compositions change into a fluid state on heating, and harden irreversibly at higher temperatures.

Novolak phenolic resin compositions can be used for injection molding when they have a sufficiently long working life in the fluid state (plastic life) and harden completely at temperatures higher than those at which the said compositions become fluid.

In order to improve the thermal stability in the fluid state it is usual to add to these molding compositions small amounts of oxides and acids of boron, such as for example boric anhydride, orthoboric and metaboric acids, or possibly combinations of said oxides or acids with hexamine, such as hexamine metaborate.

According to a non pre-published Patent Application in the name of the Applicant (Italian Patent Application No. 30,494 A/75) it has also been proposed to use a thermosetting molding composition comprising:

(a) from 15 to 20 wt.% of novolak phenolic resin;
(b) from 3 to 10 wt.% of hexamine;
(c) from 1 to 4 wt.% of a stabilizing-catalyzing mixture consisting of an amine chosen from aliphatic compounds having two or more amino groups, aromatic compounds having one amino group linked to an aromatic ring and aromatic compounds having two or more amino group linked to one or more aromatic rings, and orthoboric or metaboric acid, wherein the ratio between said amino group and the number of acid equivalents in said mixture is from 0.001:1 to 0.3:1;
(d) from 0.5 to 2 wt.% of alkaline earth metal oxide; and
(e) one or more inert fillers.

The molding compositions must be in a suitable physical form for working and for transformation into molded articles and to this end it is usual to form the said compositions into granules.

Thus, according to a known method, the novolak phenolic resin and all the other constituents of the composition are homogenized in a suitable mixer and the homogenized mixture is calendered and transformed into a sheet. The latter is ground and the ground product is sieved to separate the granules whose size is within the desired range of values.

According to another known method the constituents of the composition are melted and homogenized in a screw extruder and the extruded product is cooled and cut into granules of the required size.

By means of the first method described irregular granules are obtained, whereas the second method enables one to obtain uniform or substantially uniform granules.

In each case the characteristics of the said granules are unsatisfactory because of their low flowability, and their tendency to liberate fine dust, with consequent pollution of the working environment and loss of useful product.

It has been proposed to treat the granules with particular substances capable of forming a film on the granules.

Such an expedient, although making it possible to eliminate, or at least to reduce the release of dust, sometimes involves a reduction in the aesthetic characteristics of the finished product owing to phenomena of opacity or to the formation of surface spots.

In consequence the granular compositions coated in this manner are undesirable in various fields of application, such as, for example, that of hygienic-sanitary articles.

It has now been found that it is possible to avoid, or at least substantially to reduce the disadvantages of the prior art and to prepare novolak phenolic resin compositions suitable for injection molding, in the form of regular granules, having high flowability and free from any tendency to release dust.

Moreover, the hardened articles obtained from these compositions are free from surface defects such as opacity, spots or other defects.

Thus, the invention provides a process for forming a novolak resin composition into molding granules, characterized by:

(a) homogenizing the novolak resin composition at a temperature above the melting point of the novolak resin;
(b) feeding the homogenized composition, at a temperature at which the said composition shows plasticity, but lower than the melting point of the novolak resin, between at least one pair of internally cooled rollers rotating in opposite directions with respect to each other with a peripheral speed of 0.15 to 0.30 m/sec., and having external surfaces separated from one another by a distance of 0.6 to 2 cm, so as to produce a coherent sheet by calendering;
(c) rolling the said coherent sheet between a pair of internally cooled rollers, at least one of which has a plurality of indentations, rotating in opposite direction with respect to each other with a peripheral speed of 0.3 to 0.8 m/sec. and having external surfaces separated from each other by a distance of 0.02 to 0.5 cm, so as to produce a coherent embossed sheet;
(d) fracturating the said coherent embossed sheet and separating the granules having substantially the shape of the embossments from the fine and coarse fractions;
(e) mixing said granules with a liquid coating material comprising from 0.3 to 3 wt.%, with respect to the weight of the granules, of at least one coating agent chosen from: substituted phenols; polyphenols; products of the condensation, in an acid or alkaline medium, of phenol, substituted phenols or polyphenols with an aldehyde; and mixtures of said substituted phenols, polyphenols and condensation products with phenol; and
(f) heat-treating the coated granules thus obtained by flowing through the latter of a stream of inert gas having a temperature not exceeding 130° C.

The compositions which may be subjected to the process of the present invention typically comprise:

a novolak phenolic resin in an amount of from 15 to 50% by weight;

hexamine in an amount of from 3 to 10% by weight;

one or more oxides of alkaline earth metals in an amount of from 0.5 to 2% by weight;

orthoboric or metaboric acid or a mixture of the two in an amount of from 0.2 to 2% by weight;

the remaining percentage consisting of inert fillers and possibly also small amounts of conventional additives, such as lubricants, dyes and pigments.

The novolak phenolic resins are generally obtained by condensation of formaldehyde with phenol in a molar ratio of less than 1:1 and preferably from 0.8:1 to 0.98:1, operating in the presence of mineral or organic acids.

The oxides of the alkaline earth metals are generally selected from those of calcium and magnesium.

The compositions may also contain the aforesaid stabilizing-catalyzing mixture in place of orthoboric and metaboric acids, in an amount of from 1 to 4 wt.% with respect to the composition.

The inert fillers may be of organic or mineral nature, such as, for example, wood flour, cellulose, organic fibers and fabrics, paper fibers, asbestos, mica, fluorite, talc, diatomite and rock flour. The composition usually contains from 0.5 to 3% by weight of lubricant, preferably selected from waxes, stearic acid and its esters, and zinc, calcium and magnesium stearates.

Other additives generally present in the composition are dyes and pigments.

A preferred embodiment of the process of the invention will now be described. In the accompanying drawing the single FIGURE schematically illustrates a part of the process according to this invention.

Stage (a)

The constituents of the compositions are first mixed, for example in a paddle mixer, and homogenization is then carried out.

For this purpose it is convenient to use an extruder in which temperatures are maintained which decrease from the inlet to the outlet, so that the composition is melted (without reaching the hardening temperature) in the initial part of the extruder and is at a temperature below the melting point of the novolak resin, but in a plastic state, at the outlet of the extruder.

More particularly, in the initial part of the extruder heating temperatures typically of the order of 100° C. are maintained so as to achieve perfect homogenization of the constituents of the composition. The heating temperatures at the outlet of the extruder are maintained at values of about 20° C. below the melting point of the novolak resin, since within this range of values the composition has those qualities of plasticity which have been referred to previously.

Stage (b)

The composition discharged from the extruder in the form of chips, granules or in other form is fed directly between two rollers rotating in opposite directions with respect to each other, at a peripheral speed of 0.15 to 0.3 m/sec., the distance between the external rotating surfaces being kept at a value of from 0.6 to 2 cm.

The external surface of the said rollers may be smooth or knurled and, furthermore, cooling is effected by means of water or some other fluid circulating within the said rollers.

By operating under these conditions the composition subjected to treatment is transformed into a coherent sheet, which can easily be sent on to its subsequent treatment in stage (c).

Operation outside the aforementioned limits of peripheral speed and distance between the rollers can give rise to inconvenience, for example the sheet may wind itself round the rollers.

The best conditions are achieved with peripheral speeds of the rollers of the order of 0.15–0.2 m/sec and with a distance between rotating surfaces of the order of 1 cm. Moreover, the cooling is generally such as to ensure a temperature of the sheet produced of from 20° C. to 70° C.

Obviously, it is possible to use two or more pairs of rotating rollers in stage (b), each pair operating within the range of conditions previously described.

Stage (c)

The coherent sheet resulting from the preceding stage is fed between a pair of rollers, at least one of which has a plurality of indentations, rotating in opposite directions to each other with a peripheral speed of 0.3 to 0.8 m/sec., the distance between the external rotating surfaces being maintained at a value of 0.02 to 0.5 cm.

The depth of the indentations should be such as to obtain an overall thickness of the embossed sheet (including the embossments) not exceeding the thickness of the coherent sheet submitted to rolling. In order to give to the granules the required mechanical properties, the ratio between said overall thickness and the thickness of the sheet submitted to rolling should preferably be less than 1:2, satisfactory results being obtained with a ratio of from 1:2 to 1:4.

The indentations provided on the rollers may have a hemispherical or a semi-cylindrical form (especially with the two edges rounded), or may have a semi-lenticular or other form, their dimensions being such as to obtain granules with a size of from 1 to 9 mm and preferably of the order of 6 mm. Preferably both the rollers have indentations of identical form and dimensions, the indentations of one roller being complementary to those of the other roller under the conditions of rotation of the said rollers. Obviously solutions are possible in which one roller is indented and the other roller has a smooth external surface.

Moreover, it is convenient to cool the said rollers by means of circulation of a fluid within the rollers.

By operating under the conditions described, a coherent embossed sheet is obtained and it is noted in this connection that by operating outside the conditions described the inconveniences mentioned in relation to stage b) may occur.

The best conditions are achieved with peripheral speeds of the rollers of the order of 0.6–0.7 m/sec., with a distance between the external rotating surfaces of the order of 0.05–0.2 cm and with cooling such as to obtain a hard embossed sheet.

Stage (d)

The embossed sheet produced as described in the preceding stage is fractured. Thus the sheet is made to break-up along the lines of lower resistance with separation of granules having substantially the shape and size of the embossments impressed by the rollers in stage (c).

Obviously fine powders are also formed, although in small quantity, and these are separated by sieving and are recycled to the homogenization stage (stage (a)).

During the sieving operation the coarse fraction due to those parts of the embossed sheet which have not been completely fractured is also separated.

The coarse fraction is recycled to the fracturating operation.

Stage (e)

The granules of regular shape produced and separated in the preceding stage are mixed with the liquid coating material, so as to coat the surface of the said granules uniformly.

The liquid coating material may consist of a solution of the coating agent in an organic solvent. As an alternative, the coating agent may directly be used as coating material when said coating agent is liquid under the mixing conditions.

The mixtures with phenol generally contain from 20 to 50% by weight of phenol and preferably from 30 to 40% by weight. The substituted phenols are generally alkylphenols and aryl-phenols such as para-phenylphenol, paratert-butylphenol, para-cumylphenol and the para-substituted phenol which is obtained by alkylation of phenol with styrene in an acid medium.

The polyphenols are preferably bisphenols, such as 2,2-bis-(p-hydroxyphenyl) propane (bisphenol-A), trisphenols and natural resins, such as those identified by the tradename Winsol.

The condensation products are preferably those obtained by condensing formaldehyde with the said phenol, substituted phenols, polyphenols and their mixtures. The molar ratio of the formaldehyde to the said phenolic compounds is generally from 0.2:1 to 0.5:1 and the condensation reaction is generally carried out in the presence of an acid or boron catalyst.

When phenol is used among the reagents in the condensation reaction products containing free phenol are obtained, which can be used directly as coating agents. Particularly useful for the purposes of the present invention are coating agents which are liquid under normal conditions or those solid coating agents which possess characteristics of high solubility in polar organic solvents of alcoholic or ketonic nature.

The mixing of the granules with the coating material is conveniently carried out in rotating apparatus, for example, a double cone unit or in vibrating homogenizers.

The operation is generally carried out at ambient temperature (20°-25° C.) and over periods of time such as to ensure good absorption of the liquid coating material by the granules. Periods of 5 to 30 minutes are generally suitable for the purpose.

Stage (f)

The coated granules are subjected to heat treatment by flowing through the latter a stream of gas having a temperature not exceeding 130° C. and preferably from 90 to 120° C.

A gas inert to the materials subjected to treatment, such as air, is used for the purpose.

During the heat treatment any solvent used for dissolving the coating agent is removed and possibly also a portion of the phenol contained in the said coating agent.

Moreover, by means of the treatment under discussion the uniformity and consistency of the film coating the granules is improved so that the granules are given excellent aesthetic characteristics and characteristics of resistance to abrasion and impact, as well as those characteristics due to a capacity not to liberate dust.

Generally the heat treatment is carried out for a period of from 1 to 10 minutes.

The coated granules prepared according to the process of the present invention possess a high degree of flowability, they are mechanically strong and are suitable for transformation into manufactured products having high aesthetic characteristics.

Furthermore, during the transformations described no appreciable changes occur in the characteristics of the composition such as, for example, those relating to its degree of fluidity or flowability, as will be shown by the following experimental Examples.

EXAMPLE 1

A composition is used of which the constituents and their parts by weight are given in the following list:

| | |
|---|---|
| Novolak phenolic resin (melting point: 72°-73° C.) | 40 |
| Hexamine | 6.8 |
| Magnesium oxide | 1 |
| Zinc stearate | 1.2 |
| Orthoboric acid | 1.5 |
| Diatomite | 9 |
| Talc | 3 |
| Woof flour | 34.8 |
| Induline | 1.3 |
| Nigrosine | 1.2 |
| Calcium oxide | 0.2 |

The constituents are blended in a paddle mixer over a period of 10 minutes at ambient temperature and the mixture is fed into a twin-screw extruder, the temperature of the heating jacket of which descreases from about 100° C. in the inlet zone down to about 50° C. in the outlet zone.

With reference to the accompanying drawing, the composition discharged from the extruder in the form of chips with average size of 3-5 cm. is fed between a pair of hollow rollers 10, 12 rotating in opposite directions to each other with a peripheral speed of 0.15 m/sec., the external surfaces of the said rollers being placed at a distance of 1 cm apart. The cylinders 10, 12 are cooled by internal circulation of water.

Thus a coherent sheet 14 is discharged. The said sheet is fed between a pair of indented rollers 16, 18 rotating in opposite directions to each other, with a peripheral speed of 0.7 m/sec., the external surfaces of the said rollers being placed at a distance of 1 mm apart.

The indentations 20 impressed on one roller, are complementary to those of 20' of the other roller under the conditions of rotation. These indentations 20, 20' are each of semi-cylindrical form with rounded edges, the small cylinder produced by two complementary indentations having the following dimensions: diameter 3 mm and length 6 mm.

Finally, the indented rollers 16, 18 are hollow and cooled by internal circulation of water.

Thus a hard embossed sheet 14a is discharged at a temperature of about 35° C. and this is fracturated by means of a wheel provided with fracturing blades (not shown).

During the fracturating treatment, powder is formed in an amount equal to about 10% by weight of the material fed in. This powder is recycled to the homogenization stage.

The small cylinders separated are mixed over a period of 10 minutes in a rotating double cone with a quantity equal to 0.4% of their weight of a liquid coating agent having the following characteristics:

| Viscosity at 25° C. in cps | 50–62 |
|---|---|
| Refractive index at 25° C. | 1.577–1.584 |
| Density at 25° C. | 1.080–1.087 |
| pH | 6–7 |

The liquid coating agent has been obtained by reacting phenol and styrene in a 1.87:1 molar ratio, in the presence of 0.183% by weight (with respect to the weight of reagents) of p-toluenesulfonic acid, and neutralizing the product of the reaction with ammonia up to a pH of 6–7.

The small cylinders thus coated are subjected to heat treatment by flowing a stream of air having an inlet temperature of 115°–120° C. and an outlet temperature of 95°–100° C. The contact time is equal to about 2 minutes.

The small cylinders are cooled and have a glossy surface and are free from odor. Furthermore they do not release dust during handling.

The following characteristics are determined for the composition:

"Fluidity"

A hydraulic press provided with a pressure reduction unit, and a disc-shaped die having a diameter of 34 cm, subdivided into 7 concentric circles, is used.

The plates of the press are electrically heated and the determination is carried out under the following conditions: temperature 160°–165° C.; total pressure applied 30,000 Kg.; time 60 seconds.

50 grams of the composition under examination are placed at the centre of the die and the speed of descent of the piston in the final closing stage is controlled to 0.3 cm/sec. The time which elapses between the loading of the material in the die and the application of pressure is 10±0.5 seconds.

After 60 seconds the test specimen is extracted in the form of a thin disc the diameter of which depends on the fluidity of the composition under examination.

The fluidity, or flowability, of the composition is expressed as the number of circles impressed on the disc, excluding the first one which is taken as zero value.

"Flow index"

A hydraulic press, provided with a pressure reduction unit, and an open chromium plated die in the form of a bowl of type UNI 4272, is used.

The plates of the press are electrically heated and the determination is carried out under the following conditions: temperature 160°–165° C.; total pressure applied 5000 Kg.

In particular, a measured quantity of the compound under examination is placed in the cavity of the die and the pressure is applied. At the moment at which the needle of the manometer connected to the press indicates an increase in pressure, the chronometer is started. When the upper plate of the press has completed its descent, the chronometer is stopped.

The time elapsed, expressed in seconds, is defined as the flow index.

"Rigidity"

This is the deformation which the bowl of type UNI 4272 undergoes under a load of 4 Kg for 30 seconds, after remaining in the mold for a period of 50 seconds.

The "rigidity" is expressed in millimetres.

"Surface appearance"

This is evaluated on moulded articles in accordance with an empiric scale of 0 to 10, the value 10 being ascribed in the case of maximum gloss and stress relief.

The values of the fluidity, flow index, rigidity and surface appearance for the composition of Example 1 are recorded in Table 1:

after discharge from the homogenization extruder (under A);

after discharge from the pair of indented rollers (under B);

after coating of the granules and drying (under C).

TABLE 1

|  | A | B | C |
|---|---|---|---|
| Fluidity | 7 | 7 | 7 |
| Flow index | 5–6 | 5–6 | 5–6 |
| Rigidity | 1.5 | 1.5 | 1.5 |
| Surface appearance | 6 | 6 | 6 |

It will be noted from the above data that the composition does not undergo any change in its characteristics as a result of the treatments which lead up to the formation of the coated, free-flowing granules.

EXAMPLE 2

This test is carried out as in Example 1, using as a coating agent, the product obtained by reacting the coating agent of Example 1 with formaldehyde in a 1:0.25 molar ratio and in an acid medium, and having the following characteristics:

| dry matter content (% by weight) | 70.3 |
|---|---|
| Viscosity at 25° C. in cps | 212 |
| Refractive index at 25° C. | 1.5857 |
| pH | 6 |

The characteristics of the composition after coating of the granules and drying are recorded in Table 2.

EXAMPLE 3

This test is carried out as in Example 1 using as a coating agent the product obtained by reacting the coating agent of Example 1 with formaldehyde, in a 1:0.4 molar ratio and in an alkaline medium, and having the following characteristics:

| dry matter content (% by weight) | 63.5 |
|---|---|
| viscosity at 25° C. in cps | 85 |
| refractive index at 25° C. | 1.5770 |
| pH | 7.2 |

The characteristics of the composition after coating of the granules and drying are recorded in Table 2.

TABLE 2

|  | Example 2 | Example 3 |
|---|---|---|
| Fluidity | 7 | 7 |

TABLE 2-continued

| | Example 2 | Example 3 |
|---|---|---|
| Flow index | 5-6 | 5-6 |
| Rigidity | 2.2 | 1.8 |
| Surface appearance | 9 | 8 |

What we claim is:

1. A process for forming a novolak resin composition into molding granules, which comprises:
   (a) homogenizing the novolak resin composition at a temperature above the melting point of the novolak resin;
   (b) feeding the homogenized composition, at a temperature at which the said composition shows plasticity, but lower than the melting point of the novolak resin, between at least one pair of internally cooled rollers rotating in opposite directions with respect to each other with a peripheral speed of 0.15 to 0.30 m/sec., and having external surfaces separated from one another by a distance of 0.6 to 2 cm, so as to produce a coherent sheet by calendering;
   (c) rolling said coherent sheet between a pair of internally cooled rollers, at least one of which has a plurality of indentations, rotating in opposite direction with respect to each other with a peripheral speed of 0.3 to 0.8 m/sec. and having external surfaces separated from each other by a distance of 0.02 to 0.5 cm, so as to produce a coherent embossed sheet;
   (d) fracturing the said coherent embossed sheet and separating the granules having substantially the shape of the embossments from the fine and coarse fractions;
   (e) mixing said granules with a liquid coating material comprising from 0.3 to 3 wt.%, with respect to the weight of the granules, of at least one coating agent selected from the group consisting of substituted phenols; polyphenols; products of the condensation, in an acid or alkaline medium, of phenol, substituted phenols or polyphenols with an aldehyde; and mixtures of said substituted phenols, polyphenols and condensation products with phenol; and
   (f) heat-treating the coated granules thus obtained by flowing through the latter a stream of inert gas having a temperature not exceeding 130° C.

2. The process of claim 1, in which stage (a) is carried out by extruding the composition, maintaining in the initial part of the extruder a temperature above the melting point of the novolak resin and a temperature of the order of 20° C. below the melting point of the novolak resin at the outlet of the extruder.

3. The process of claim 1, in which stage (b) is carried out with a peripheral speed of the rollers of from 0.15 to 0.2 m/sec and with a distance between the rotating surfaces of about 1 cm.

4. The process of claim 1, in which stage (c) is carried out with a peripheral speed of the rollers of from 0.6 to 0.7 m/sec and with a distance between the rotating surfaces of 0.05 to 0.2 cm.

5. The process of claim 1, in which the indentations are of hemispherical, semi-cylindrical or semi-lenticular form, with dimensions such as to obtain granules of from 1 to 9 mm in size.

6. The process of claim 1, in which stage (c) is carried out with two rollers having indentations of identical form and dimensions, the indentations of one roller being complementary to those of the other roller under the conditions of rotation of the said two rollers.

7. The process of claim 1, in which said aldehyde is formaldehyde.

8. The process of claim 1, in which said mixtures with phenol contain from 20 to 50 wt.% of phenol.

9. The process of claim 1, in which said substituted phenol is para-phenylphenol.

10. The process of claim 1, in which said substituted phenol is para-tert-butylphenol.

11. The process of claim 1, in which said substituted phenol is para-cumylphenol.

12. The process of claim 1, in which said substituted phenol is the para substituted phenol obtained by reacting phenol with styrene in an acid medium.

13. The process of claim 1, in which stage (e) is carried out at ambient temperature and for a period of from 5 to 30 minutes.

14. The process of claim 1, in which stage (f) is carried out for a period of from 1 to 10 minutes, using a stream of gas having a temperature of from 90° to 120° C.

15. A process for forming a novolak resin composition into molding granules, which comprises:
   (a) homogenizing the novolak resin composition at a temperature above the melting point of the novolak resin;
   (b) feeding the homogenized composition, at a temperature at which the said composition shows plasticity, but lower than the melting point of the novolak resin, between at least one pair of internally cooled rollers rotating in opposite directions with respect to each other with a peripheral speed of 0.15 to 0.30 m/sec., and having external surfaces separated from one another by a distance of 0.6 to 2 cm, so as to produce a coherent sheet by calendering;
   (c) rolling said coherent sheet between a pair of internally cooled rollers, at least one of which has a plurality of indentations, rotating in opposite direction with respect to each other with a peripheral speed of 0.3 to 0.8 m/sec. and having external surfaces separated from each other by a distance of 0.02 to 0.5 cm, so as to produce a coherent embossed sheet;
   (d) fracturing the said coherent embossed sheet and separating the granules having substantially the shape of the embossments from the fine and coarse fractions,
   (e) mixing said granules with a liquid coating material comprising from 0.3 to 3 wt.%, with respect to the weight of the granules, of at least one coating agent selected from the group consisting of (a) alkyl phenols, aryl phenols, bisphenols, trisphenols and natural phenolic resins; (b) products of the condensation of phenol and/or compounds (a) with formaldehyde in an acid or alkaline medium and in a molar ratio of formaldehyde to phenol and/or compounds (a) of from 0.2:1 to 0.5:1; and (c) mixtures of said compounds (a) and products (b) with phenol;
   (f) heat-treating the coated granules thus obtained by flowing through the latter a stream of inert gas having a temperature not exceeding 130° C.

16. The process of claim 1 in which the internally cooled rollers lower the temperature of said coherent sheet to about 20° to 70° C.

17. The process of claim 1 in which the rolling in step (c) reduces the overall thickness of said embossed sheet including embossments to less than the thickness of the sheet as it enters said rollers.

18. The process of claim 1 in which the ratio of the overall thickness of said embossed sheet to the thickness of the calendared sheet prior to embossing is less than about 1:2.

19. The process of claim 1 in which said heat-treated granules are free flowing and free from a tendency to release dust.

* * * * *